(12) United States Patent
Satran et al.

(10) Patent No.: US 7,775,750 B2
(45) Date of Patent: Aug. 17, 2010

(54) TANGENTIAL CUTTING INSERT HAVING A BASE PROTRUSION

(75) Inventors: Amir Satran, Kfar Vradim (IL); Osama Atar, Yarka (IL)

(73) Assignee: Iscar, Ltd., Tefen (IL)

( * ) Notice: Subject to any disclaimer, the term of this patent is extended or adjusted under 35 U.S.C. 154(b) by 260 days.

(21) Appl. No.: 11/870,499

(22) Filed: Oct. 11, 2007

(65) Prior Publication Data

US 2008/0095586 A1 Apr. 24, 2008

(30) Foreign Application Priority Data

Oct. 23, 2006 (IL) .................................... 178813

(51) Int. Cl.
*B23B 5/20* (2006.01)
(52) U.S. Cl. ...................... 407/113; 407/42; 407/48
(58) Field of Classification Search .................. 407/42, 407/113, 116, 66, 67, 33, 56, 61
See application file for complete search history.

(56) References Cited

U.S. PATENT DOCUMENTS

| | | | | |
|---|---|---|---|---|
| 280,148 | A * | 6/1883 | Douglas | 407/64 |
| 1,332,898 | A * | 3/1920 | Hossie et al. | 408/82 |
| 4,182,587 | A * | 1/1980 | Striegl | 407/113 |
| 4,315,706 | A * | 2/1982 | Erkfritz | 407/101 |
| 4,411,564 | A | 10/1983 | Johnson | |
| 4,566,827 | A * | 1/1986 | Neumueller | 407/42 |
| 4,569,619 | A * | 2/1986 | Newton | 407/15 |
| 4,712,949 | A * | 12/1987 | Johnson | 407/42 |
| 4,812,087 | A * | 3/1989 | Stashko | 407/42 |
| 4,840,518 | A * | 6/1989 | Plutschuck et al. | 407/113 |
| 4,919,573 | A | 4/1990 | Tsujimura et al. | |

(Continued)

FOREIGN PATENT DOCUMENTS

CN 686935 A5 * 8/1996

(Continued)

OTHER PUBLICATIONS

International Search Report mailed on Mar. 27, 2008 in PCT/IL2007/001238.

*Primary Examiner*—Jason Daniel Prone
*Assistant Examiner*—Jennifer Swinney
(74) *Attorney, Agent, or Firm*—Womble Carlyle

(57) ABSTRACT

A tangential cutting insert has an insert body provided with a convex upper surface, a bottom surface provided with a cylindrical insert protrusion, and a peripheral side surface including a pair of opposing major side surfaces and a pair of opposing minor side surfaces. A sloped, major cutting edge in formed at the intersection of each major side surface with the top surface, the rake surface being formed in the major side surface. The bottom surface is provided with an insert protrusion abutment surface for seating the cutting insert. An insert recess is formed in the cylindrical insert protrusion, and this recess communicates with the insert's through bore. The cutting insert is seated in an insert pocket with the insert protrusion abutment surface in abutment with the pocket case. A cylindrical pocket protrusion rising from the pocket base and having a threaded bore formed therein enters the recess and is aligned with the insert's through bore. This allows the threads of a clamping screw to engage complementary threads formed in the threaded bore at a point that is close to the through bore.

25 Claims, 14 Drawing Sheets

U.S. PATENT DOCUMENTS

| | | | | |
|---|---|---|---|---|
| 5,244,318 | A * | 9/1993 | Arai et al. | 407/42 |
| 5,314,269 | A * | 5/1994 | Arai et al. | 407/42 |
| 5,330,295 | A * | 7/1994 | Pawlik | 407/42 |
| 5,477,754 | A * | 12/1995 | Herbon | 76/101.1 |
| 5,607,263 | A * | 3/1997 | Nespeta et al. | 407/61 |
| 5,653,274 | A | 8/1997 | Johnson et al. | |
| 5,692,860 | A | 12/1997 | Kramer | |
| 5,741,095 | A * | 4/1998 | Charron et al. | 407/42 |
| 5,853,267 | A * | 12/1998 | Satran et al. | 407/113 |
| 5,944,456 | A * | 8/1999 | Shirley et al. | 407/42 |
| 5,957,629 | A * | 9/1999 | Hessman et al. | 407/113 |
| 6,050,752 | A | 4/2000 | DeRoche | |
| 6,196,770 | B1 * | 3/2001 | Astrom et al. | 407/40 |
| 6,203,251 | B1 * | 3/2001 | Oppelt et al. | 407/48 |
| 6,217,263 | B1 | 4/2001 | Wiman et al. | |
| 6,508,612 | B1 * | 1/2003 | Baca | 407/43 |
| 6,536,996 | B2 * | 3/2003 | Satran et al. | 407/34 |
| 6,607,334 | B2 * | 8/2003 | Satran et al. | 407/35 |
| 6,709,205 | B2 * | 3/2004 | Morgulis et al. | 407/113 |
| 6,773,209 | B2 | 8/2004 | Craig | |
| 6,810,561 | B1 * | 11/2004 | Liu | 16/42 T |
| 6,811,359 | B2 * | 11/2004 | Craig | 407/35 |
| 6,840,716 | B2 * | 1/2005 | Morgulis et al. | 407/34 |
| 6,896,450 | B2 * | 5/2005 | Rothenstein | 408/59 |
| 7,004,689 | B2 * | 2/2006 | DeRoche et al. | 407/48 |
| 7,090,444 | B1 * | 8/2006 | Craig | 407/113 |
| 7,094,007 | B2 * | 8/2006 | Satran et al. | 407/113 |
| 7,097,393 | B2 * | 8/2006 | Satran et al. | 407/113 |
| 7,104,736 | B2 * | 9/2006 | Satran et al. | 407/113 |
| 7,121,771 | B2 * | 10/2006 | Englund | 407/103 |
| 7,217,070 | B2 * | 5/2007 | Hecht | 408/154 |
| 7,229,236 | B2 * | 6/2007 | Craig | 407/113 |
| 7,246,973 | B2 * | 7/2007 | Johnson et al. | 407/42 |
| 2001/0051077 | A1 | 12/2001 | Nagata et al. | |
| 2002/0028116 | A1 * | 3/2002 | Morgulis | 407/67 |
| 2003/0202848 | A1 * | 10/2003 | Gamble et al. | 407/36 |
| 2003/0223829 | A1 | 12/2003 | Craig | |
| 2005/0152753 | A1 | 7/2005 | Deroche | |
| 2006/0056926 | A1 | 3/2006 | Riviere et al. | |
| 2006/0056928 | A1 | 3/2006 | Riviere et al. | |

FOREIGN PATENT DOCUMENTS

| | | |
|---|---|---|
| DE | 3321184 | 12/1984 |
| EP | 298154 A1 * | 1/1989 |
| GB | 2146276 A * | 4/1985 |
| JP | 09155622 A * | 6/1997 |
| JP | 2002200504 A * | 7/2002 |
| WO | WO 95/07784 | 3/1995 |
| WO | WO 02/055245 A1 | 7/2002 |

* cited by examiner

TANGENTIAL CUTTING INSERT HAVING A BASE PROTRUSION

FIELD OF THE INVENTION

The present invention relates to a tangential cutting insert for cutting small diameters. More particularly, it is directed to a cutting insert having a convex upper surface and a seating arrangement conducive to secure seating in an insert pocket of an insert holder.

SUMMARY OF THE INVENTION

In one aspect the present invention is directed to a tangential cutting insert. The inventive insert comprises:

an insert body having a central axis around which the cutting insert has 180° rotational symmetry, a top surface, a bottom surface, peripheral side surface extending between the top and bottom surfaces, the peripheral side surface including a pair of opposing major side surfaces connecting to a pair of minor side surfaces, and an insert through bore extending along the central axis and connecting the top and bottom surfaces;

first and second major cutting edges formed at the intersection of the major side surfaces, with the top surface having a convex contour which extends between the major cutting edges;

first and second minor cutting edges each being formed along a juncture between one side of a major side surface and an adjacent minor side surface;

wherein:

the bottom surface comprises a base surface and an insert protrusion abutment surface formed on an insert protrusion which rises above the base surface, in a bottom view of the cutting insert;

the insert protrusion is formed in a central portion of the bottom surface and is at least partially surrounded by the base surface; and an insert recess is formed in the insert protrusion along the central axis and communicates with the insert through bore, the insert recess having a maximum width dimension that is larger than a minimum diameter of the insert through bore.

In some embodiments, a major rake surface associated with a major cutting edge may be formed in each major side surface; the top surface forms a relief surface; in a major side view of the cutting insert, a first major cutting edge is sloped from a first raised inner end to first lowered outer end; and in a top view of the cutting insert, said first major cutting edge extends at an outward angle, relative to an insert longitudinal axis that passes through the minor side surfaces, from said first raised inner end to said first lowered outer end.

Furthermore, each minor side surface may be outwardly sloped from the top surface in the direction of the bottom surface.

In a top view, the cutting insert has a short diagonal D1 and the insert through bore has a minimum through bore diameter D2, and in some embodiments the ratio D2/D1 is no less than 0.3.

In some embodiments, the insert recess has a maximum diameter that may exceed a minimum diameter of the insert through bore by at least 20%. In other embodiments, the recess has a maximum diameter that exceeds a minimum diameter of the insert through bore by at least 30%.

The insert protrusion may be generally ring-shaped and truncated at opposing truncated outer wall portions. The opposing truncated outer wall portions may merge with major surface lower portions belonging to the opposing major side surfaces. In addition, a pair of opposing bottom abutment edges may be formed at a juncture of the insert protrusion abutment surface with the major surface lower portions.

The convex contour may comprise a first diagonally opposite pair of identical component convex contours and a second diagonally opposite pair of identical component convex contours. Members of the first diagonally opposite pair and members of the second diagonally opposite pair may not all lay on a common cylindrical surface, on a common ellipsoidal surface or on a common spherical surface. In one variation, members of the first diagonally opposite pair may lay on a first cylindrical surface and members of the second diagonally opposite pair may lay on a different, second cylindrical surface.

In another aspect, the present invention is directed to a rotary cutting tool having a cutting portion comprising an insert pocket having a pocket base and a cutting insert seated on the pocket base. The cutting insert is as described above with its insert protrusion abutment surface resting on the pocket base. The insert pocket is provided with a pocket protrusion that rises above the pocket base and nests within the insert recess, the pocket protrusion having a threaded bore formed therein.

The pocket protrusion may within the insert recess without contacting surfaces that define the insert recess.

In some embodiments, an outermost portion of the insert protrusion abutment surface rests on a corresponding outermost portion of the pocket base while an innermost portion of the insert protrusion abutment surface remains unsupported by the pocket base.

The rotary cutting tool may have exactly two insert pockets, each insert pocket having a cutting insert retained therein. In a tool having just two insert pockets, each of the two insert pockets has a threaded bore, each threaded bore having an axis, the axes of the threaded bores being parallel to one another and offset from each other in a lateral direction across a width of the tool. The cutting diameter of such tool may be no greater than 10 mm.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
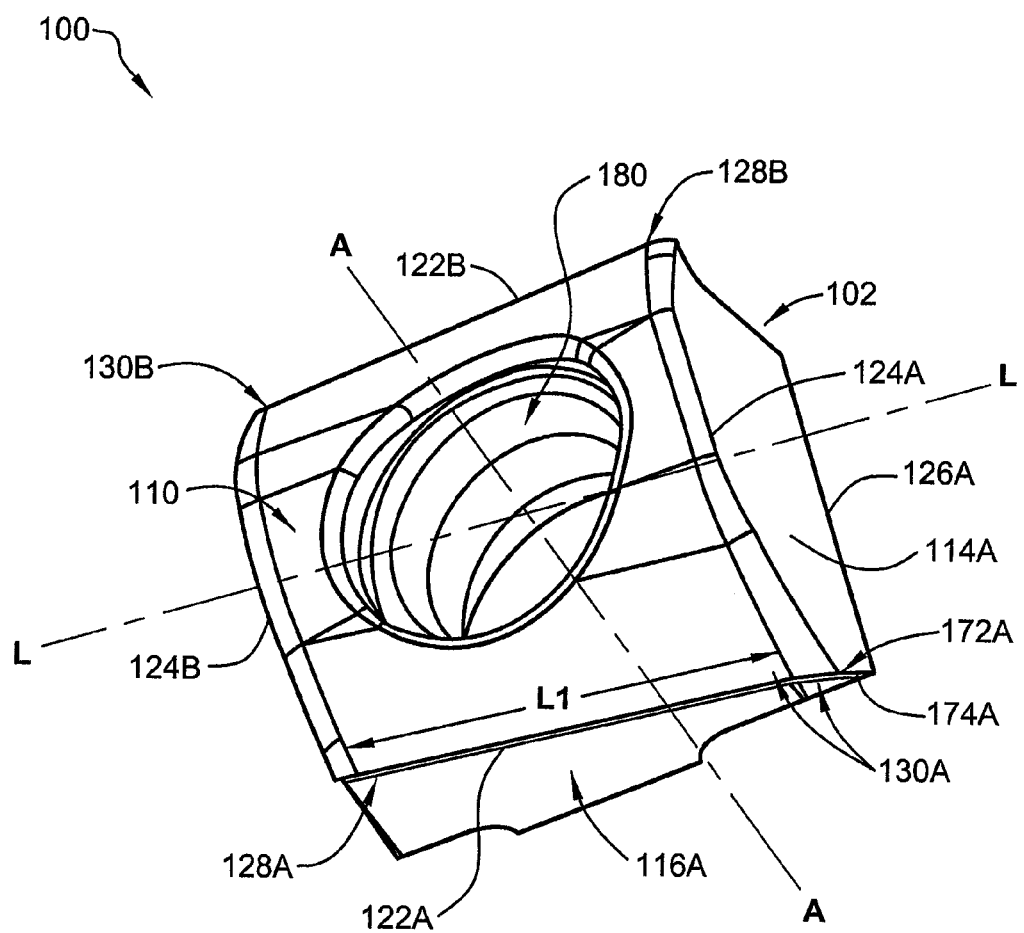
FIG. 1 shows a perspective top view of a cutting insert in accordance with the present invention.

FIG. 1 shows a top perspective view of a cutting insert 100 in accordance with the present invention. The cutting insert 100 comprises an insert body 102 having a top surface 110, a bottom surface 112, and a peripheral side surface extending between the top and bottom surfaces. The peripheral side surface includes a pair of minor side surfaces 114A, 114B connecting to a pair of major side surfaces 116A, 116B.

Figure 6:
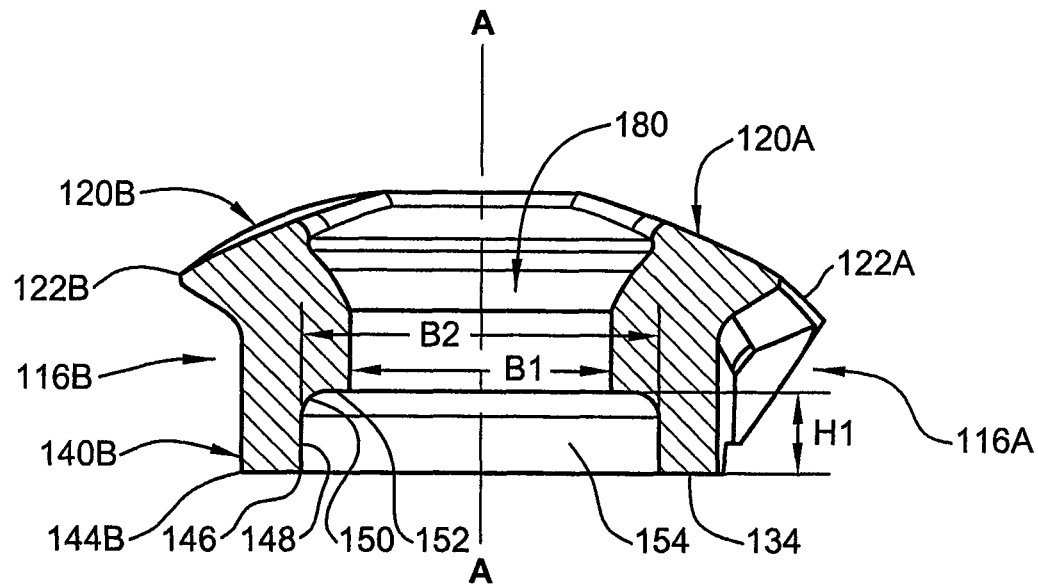
FIG. 6 shows a section view taken along section line VI-VI in FIG. 5.

The cutting insert 100 is provided with an insert through bore 180 which extends along a central axis A around which the cutting insert has 180° rotational symmetry. However, the cutting insert is not reversible in that one may not invert the insert since the top and bottom surfaces are have dissimilar structure. Furthermore, as best seen in Fig. 6, in a cross-sectional view containing central axis A, the through bore's shape at the top surface 110 differs from the through bore's shape at the insert recess 154, described further below.

The cutting insert 100 also has a longitudinal axis L which is: perpendicular to the central axis A, passes through the pair of minor side surfaces 114A, 114B at a vertical position mid-way between the topmost and bottommost portions of the insert, and forms a plane with the central axis A, across which plane the cutting insert 100 is reflection anti-symmetric in a top view of the cutting insert.

The top surface 110 has a convex contour 120 which extends between major cutting edges 122A, 122B associated with respective major side surfaces 116A, 116B. During cutting operations, the top surface 110 forms (i.e., serves as) a relief surface for an operative major cutting edge 112A, 122B while a corresponding major side surface 116A, 116B forms a major rake surface.

Figure 3:
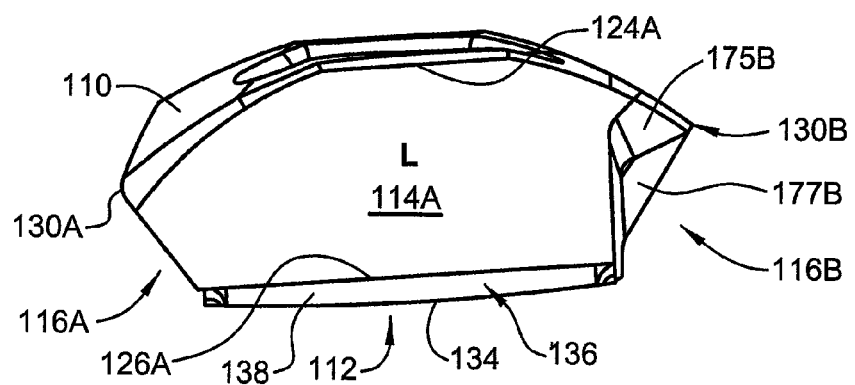
FIG. 3 shows a minor side view of the cutting insert shown in FIG. 1.

As best seen in FIGS. 1 and 3, at least a portion of each minor side surface 114A, 114B is planar, and so can serve as an abutment surface, when the cutting insert 100 is seated in an insert pocket. A minor upper edge 124A, 124B is formed between the top surface 110 and each respective minor side surface 114A, 114B. Furthermore, each minor side surface 114A, 114B extends downwardly between its respective minor upper edge 124A, 124B and a minor lower edge 126A, 126B, respectively. In one embodiment, each minor side surface 114A, 114B is outwardly sloped from the top surface 110 in the direction of the bottom surface 112, i.e., the opposing minor upper edges 124A, 124B are closer to one another than the opposing minor lower edges. In other embodiments each minor side surface 114A, 114B may be extend in a purely vertical direction, or may be even be inwardly sloped.

Figure 2:
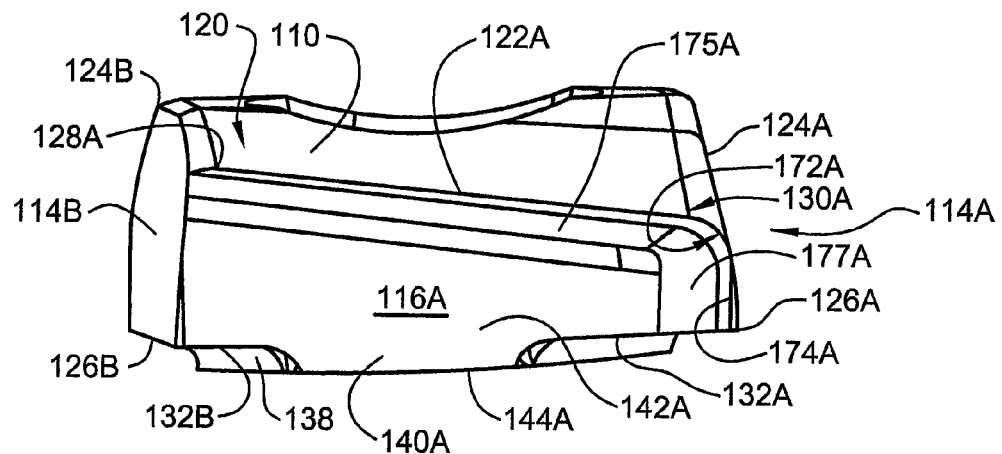
FIG. 2 shows a major side view of the cutting insert shown in FIG. 1, presenting a cutting face of the insert.

As best seen in FIG. 2, each major cutting edge 122A, 122B is sloped in a major side view of the cutting insert 100. For the major side surface 116A seen in the side view of FIG. 2, the major cutting edge 122A is downwardly sloped from a first raised inner end 128A proximate the second minor upper edge 124B to a first lowered outer end 130A proximate the first minor upper edge 124A. In one embodiment, the major cutting edges 122A, 122B follow a portion of a spiral curve.

Each major cutting edge 122A, 122B is connected to a minor cutting edge 174A, 174B, respectively, via a corner cutting edge 172A, 172B, respectively (see FIGS. 1, 2 & 6). Minor cutting edge 174A is formed along a juncture between one side of the major side surface 116A and the adjacent minor side surface 114A. Similarly, minor cutting edge 174B is formed along a juncture between one side of the major side surface 116B and the adjacent minor side surface 114B.

As seen in FIGS. 2 and 3, a major rake face 175A, 175B which is associated with the corresponding major cutting edge 122A, 122B, respectively, is formed in the corresponding major side surface 116A, 116B, respectively. A minor rake face 177A, 177B, which is associated with the corresponding minor cutting edge 174A, 174B, respectively, is also formed in the corresponding major side surface 116A, 116B, respectively. At any given time, only one major rake face and its associated minor rake face are operative, the other major rake face and associated minor rake being unexposed to a work piece.

Figure 5:
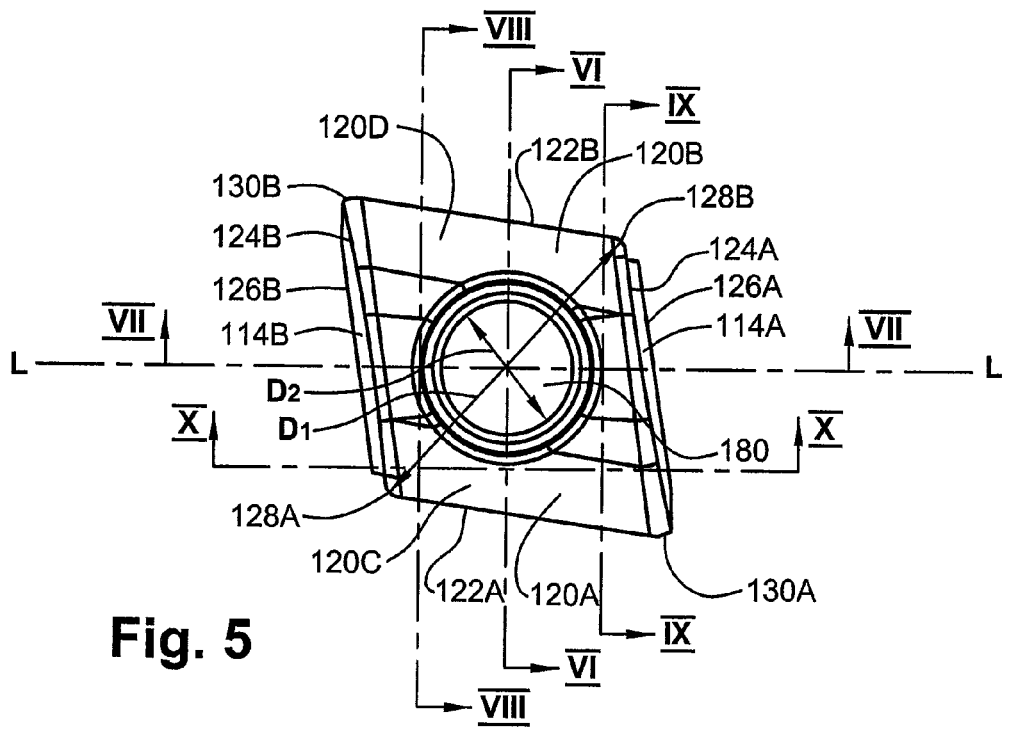
FIG. 5 shows a top view of the cutting insert shown in FIG. 1.

As best seen in FIG. 5, the cutting insert 100 has the general shape of a parallelogram, in a top view thereof. In one embodiment, in a top view, the two cutting major cutting edges 122A, 122B are straight and parallel to each other and connect to the two upper minor edges 124A, 124B which also are approximately parallel to one another. Due to this parallelogram shape, in the top view, the major cutting edge 122A extends at an outward angle, relative to the longitudinal axis L, from the first raised inner end 128A to the first lowered outer end 130A. Meanwhile, major cutting edge 122B extends at an outward angle, again relative to the longitudinal axis L, from the second raised inner end 128B to the second lowered outer end 130B. And while in a preferred embodiment the major cutting edges 122A, 122B are straight and parallel in the top view, in other embodiments they may be curved, non-parallel, or both.

As also seen in FIG. 5, in the top view, the cutting insert 100 has a short diagonal D1 while the insert through bore 180 has a minimum through bore diameter D2. In one embodiment, to help ensure secure clamping, the ratio of D2/D1 is no less than 0.3, and more preferably is at least 0.4. This allows the cutting insert 100 to accommodate a clamping screw 302 (see FIG. 20) having a threaded shaft 304 with a diameter D5 that is large, relative to the length of the cutting insert's short diagonal D1.

In one family of such inserts, the short diagonal D1 ranges from about 5 to about 13.5 mm, the minimum through bore diameter D2 ranges from about 1.5 to about 4.5 mm and the major cutting edges 122A, 122B have a length L1 that ranges 3.5-6.5 mm. In a typical embodiment, the ratio of D2/D1 ranges from about 0.25 to about 0.45 and preferably is no less than 0.30. In one specific embodiment, the ratio of D2/D1 is about 0.28, D1 is about 7 mm, D2 is about 2.5 mm and L1 is about 5.2 mm. It is understood, however, that these ratios and dimensions are only exemplary, and that a cutting insert in accordance with the present invention may take on other sizes, as well.

As further seen in FIG. 5, the convex contour 120 of the top surface 110 comprises a plurality of component convex contours 120A, 120B, 120C, 120D, arranged in diagonally opposite pairs. Component convex contours 120A and 120D are diagonally opposite from each other and form a first diagonally opposite pair, while component convex contours 120B and 120C are diagonally opposite from each other and form a second diagonally opposite pair. To preserve 180° rotational symmetry about the central axis A, the members 120A, 120D of the first diagonally opposite pair are preferably identical, and the members 120B, 120C of the second diagonally opposite pair are preferably identical as well. Also, as seen in FIG. 5, component convex contours 120A and 120C are on one side of a vertical plane that passes through the top surface 110, the longitudinal axis L and the bottom surface 112, while component convex contours 120B and 120D are on the other side of the same vertical plane. In a similar vein, component convex contours 120A and 120B are adjacent to minor side surface 114A while component convex contours 120C and 120D are adjacent to minor side surface 114B.

In one embodiment, the convex contour 120 and the component convex contours 120A, 120B, 120C, 120D all lay on a common convex geometric surface, such as a cylindrical surface, an ellipsoidal surface, a spherical surface, or the like. When all four of the component convex contours belong to the same cylindrical surface, they all have a common radius of curvature and are all centered along a line which is parallel to the longitudinal axis L. This common radius of curvature preferably is greater than a radius of curvature of the cutting path of the tool in which the insert 100 is seated, much as described in U.S. Pat. No. 5,692,860, whose contents are incorporated by reference.

In another embodiment, the convex contour 120 and the component convex contours 120A, 120B, 120C, 120D do not all lay on a common convex geometric surface, such as on a common cylindrical surface, on a common ellipsoidal surface, on a common spherical surface, or the like. For example, component convex contours 120A and 120D may lay on a first cylindrical surface while component convex contours 120A and 120D may lay on a different, second cylindrical surface, with the first cylindrical surface being centered about a first cylindrical axis and the second cylindrical surface being centered about a second cylindrical axis. In one exemplary variation, the first and second cylindrical surfaces have different radii of curvature, and the first and second cylindrical axes are spaced apart from one another, parallel to the longitudinal axis, and lay on the aforementioned vertical plane containing the longitudinal axis L.

Figure 4:
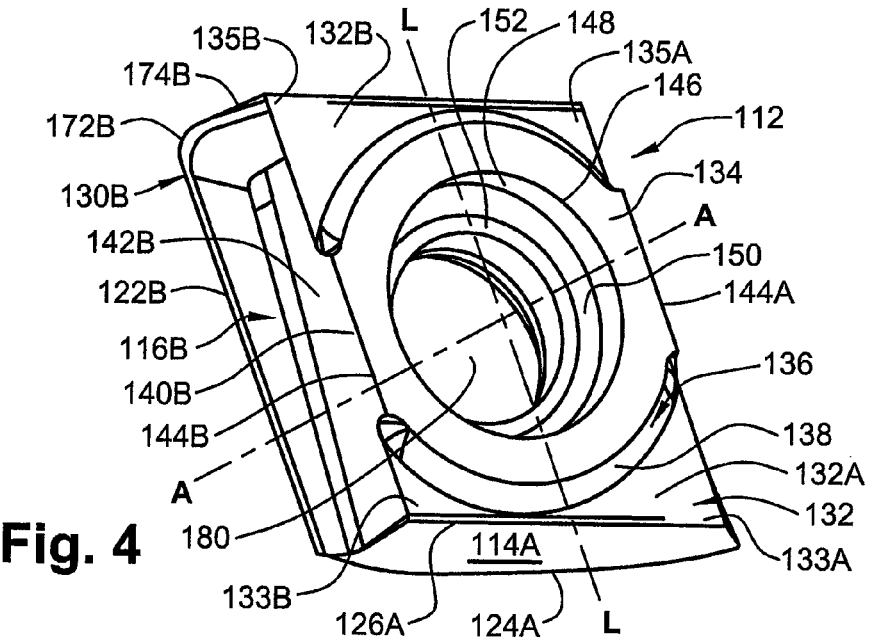
FIG. 4 shows a perspective bottom view of the cutting insert shown in FIG. 1.

FIG. 4 shows the bottom surface 112 of the cutting insert 100. The bottom surface 112 comprises a base surface 132 and an insert protrusion abutment surface 134, the latter being formed on an insert protrusion 136 which rises from the base surface 132, in a bottom view of the cutting insert 100. The insert protrusion 136 is formed in a central portion of the bottom surface 112 and is at least partially surrounded by the base surface 132. The insert through bore 180 passes through the insert protrusion 136, and the insert protrusion abutment surface 134 is centered about the central axis A.

The insert protrusion 136 is generally ring-shaped and has an outer wall 138 having an arcuate profile. In one embodiment, the insert protrusion 136 is truncated at opposing truncated outer wall portions 140A, 140B. These opposing truncated outer wall portions 140A, 140B merge with major surface lower portions 142A, 142B which belong to the opposing major side surfaces 116A, 116B, respectively. A pair of opposing bottom abutment edges 144A, 144B is formed at the juncture of the insert protrusion abutment surface 134 (at the opposing truncated outer wall portions 140A, 140B) with the major surface lower portions 142A, 142B, respectively.

In comparing the cross-sectional views of FIGS. 6, 7, 8, 9 and 10, it can be seen that the insert protrusion abutment surface 134 lies on a single plane and forms the lowest portion of the cutting insert 100. The base surface 132 is divided into a pair of base surface portions 132A, 132B, one on either side of the insert protrusion 136, and thus at least partially surrounds the latter. As best seen in FIG. 4, the insert protrusion 136 is spaced apart from the minor side surfaces 114A, 114B by the base surface portions 132A, 132B, respectively. Accordingly, the base surface portions 132A and 132B form a raised lip, or undercut.

The first base surface portion 132A includes a first pair of lower insert corners 133A, 133B while the second base surface portion 132B includes a second pair of lower insert corners 135A, 135B. As seen in FIG. 4, first lower insert corner 133A is formed proximate the juncture of first base surface portion 132A, the first major side surface 114A and the first minor side surface 116A; second lower insert corner 133B is formed proximate the juncture of first base surface portion 132A, the second major side surface 114B and the first minor side surface 116A; third lower insert corner 135A is formed proximate the juncture of second base surface portion 132B, the first major side surface 114A and the second minor side surface 116B; and fourth lower insert 135B is formed proximate the juncture of second base surface portion 132B, the second major side surface 114B and the second minor side surface 116B. All four lower insert corners 133A, 133B, 135A, 135B are raised relative to the insert protrusion abutment surface 134.

Figure 7:
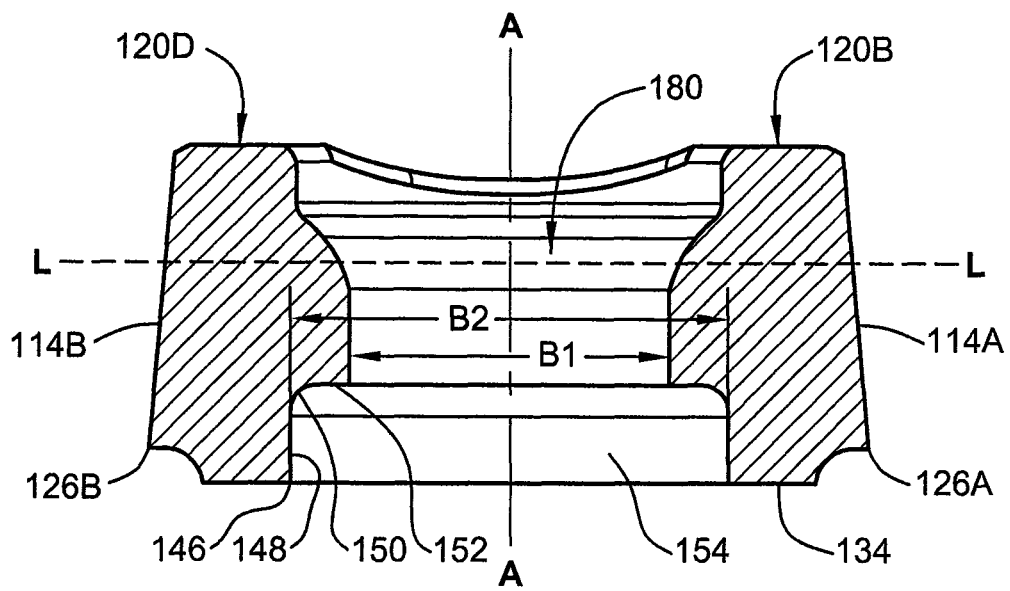
FIG. 7 shows a section view taken along section line VII-VII in FIG. 5.
Figure 8:
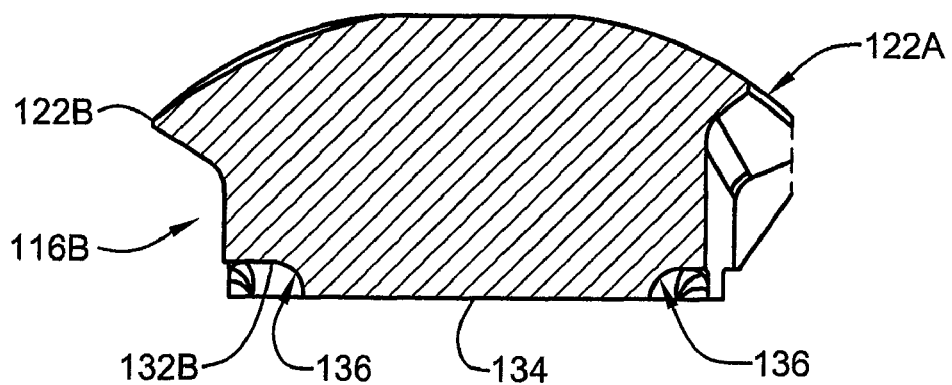
FIG. 8 shows a section view taken along section line VIII-VIII in FIG. 5.
Figure 9:
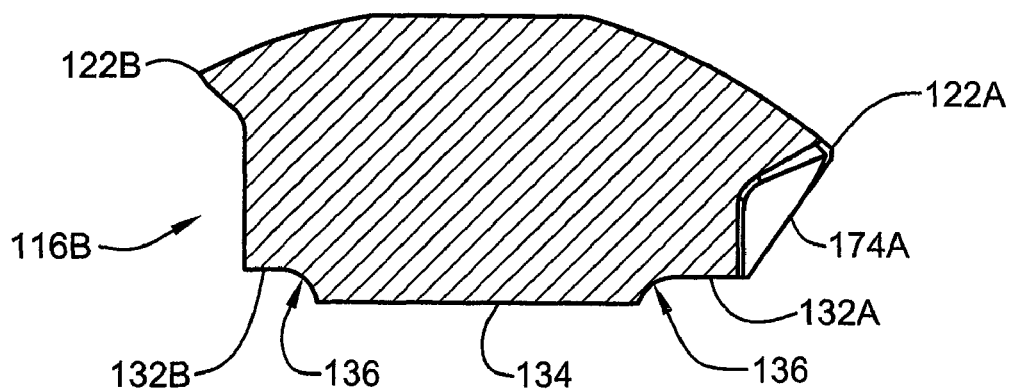
FIG. 9 shows a section view taken along section line IX-IX in FIG. 5.
Figure 10:
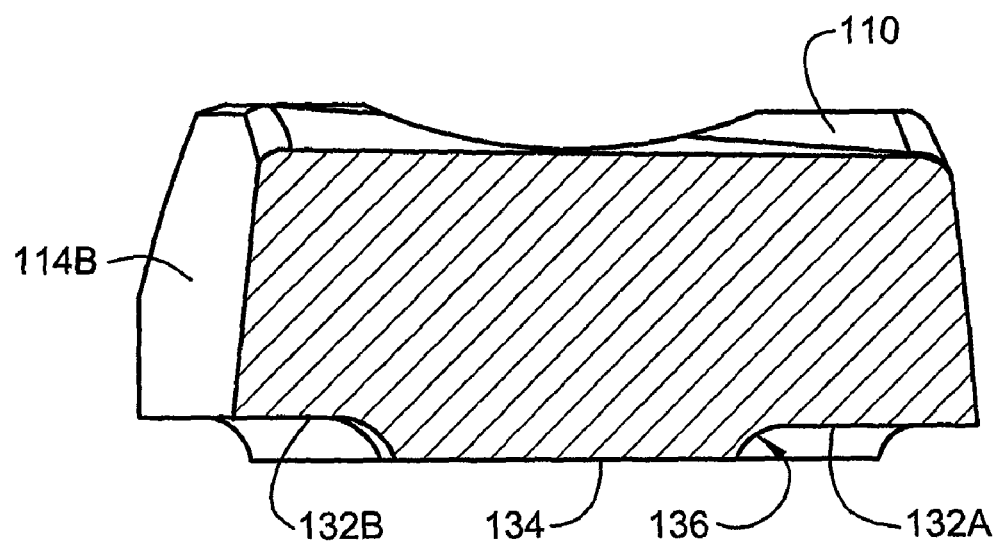
FIG. 10 shows a section view taken along section line X-X in FIG. 5.

As best seen in FIGS. 4, 6 and 7, descending from a circular inner rim 146 of the insert protrusion abutment surface 134 is an insert protrusion upper inner wall 148 which in one embodiment is cylindrical in shape and coaxial with the central axis A. The insert protrusion upper inner wall 148 merges with an insert protrusion lower inner wall 150 having a radially inwardly-curved portion which merges with a ring-shaped insert protrusion step 152 which extends radially inwardly towards the central axis A.

The insert protrusion upper inner wall 148 has a diameter B2 which is larger than a minimum diameter B1 of the insert through bore 180. Preferably, B2 is about 15% to about 45% greater than B1. In one embodiment, diameter B2 is about 20% greater than minimum diameter B1, and more preferably is about 30% greater. A recess 154 is formed in the insert protrusion abutment surface 134. The recess 154 having the diameter B2 and height H1 extends into the insert protrusion 136 and communicates with the insert through bore 180. Thus, the maximum width dimension of the recess 154 is larger than a minimum diameter of the insert through bore. While the bottom of the recess 154 is defined by the insert protrusion abutment surface 134, the sides and top of the recess 154, are at least partially defined by the protrusion upper inner wall 148, the protrusion lower inner wall 150 and the ring-shaped protrusion step 152. As discussed further below, the recess 154 is shaped to receive and accommodate a pocket protrusion 284 rising from a pocket base 270 of an insert receiving pocket 206.

The tangential cutting insert 100 is preferably formed from pressed and sintered carbide, though it may be injection molded instead. The insert protrusion abutment surface 134 may optionally be ground to achieve better seating. The major 175A, 175B and minor 177A, 177B rake surfaces may also be ground to facilitate chip formation.

Figure 11:
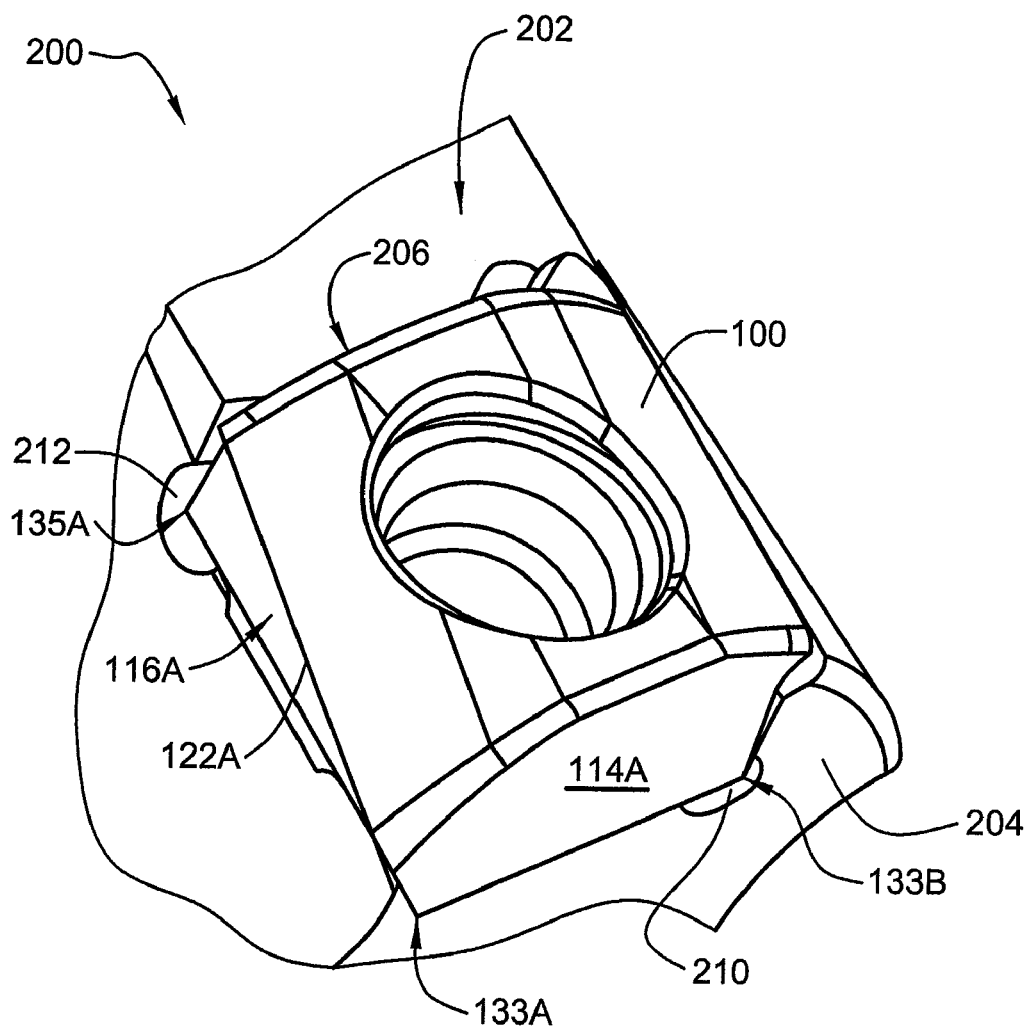
FIG. 11 shows a perspective view of the cutting insert of FIG. 1 placed in an insert pocket of a cutting portion of a cutting tool.

FIG. 11 shows a cutting insert 100 of the sort described above with respect to FIGS. 1-10, seated in an exemplary rotary cutting tool 200, in this instance, an end mill. The rotary cutting tool 200 includes a cutting portion 202 having a front face 204. It is understood that the rotary cutting tool may be a drill, an end mill or other rotary cutting tool.

Formed in the cutting portion adjacent the front face 204 is an insert pocket 206 configured to accommodate the cutting insert 100. The base 270 of the insert pocket 206 is provided with a longitudinally extending stress relief channel 210 and a laterally extending stress relief channel 212. When the cutting insert 100 is seated in the insert pocket 206 in the manner shown in FIG. 11, the second lower insert corner 133B enters longitudinally extending stress relief channel 210, the third lower insert corner 135A enters laterally extending stress relief channel 212 and the fourth lower insert corner 135B is positioned in a pocket corner recess 214 situated at the intersection of the two stress relief channels 210, 212.

Figure 12:
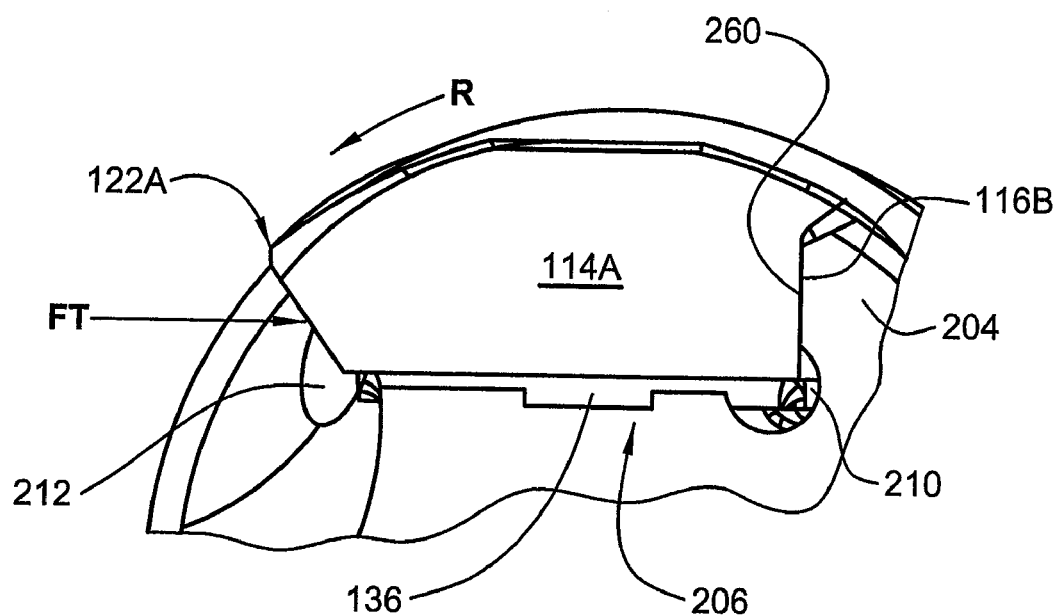
FIG. 12 shows an end view of the cutting insert and cutting tool of FIG. 11.

As seen in the front end view of the cutting tool in FIG. 12, a lower portion of the non-operative major side surface 116B abuts a longitudinally extending side wall 260 of the insert pocket 206, at a point proximate the front end 204. The longitudinally extending wall 260 helps counter the tangential component FT of the cutting forces experienced by the cutting insert 100, as the operative major cutting edge 122A encounters a work piece while cutting in the direction of rotation R.

Figure 13:
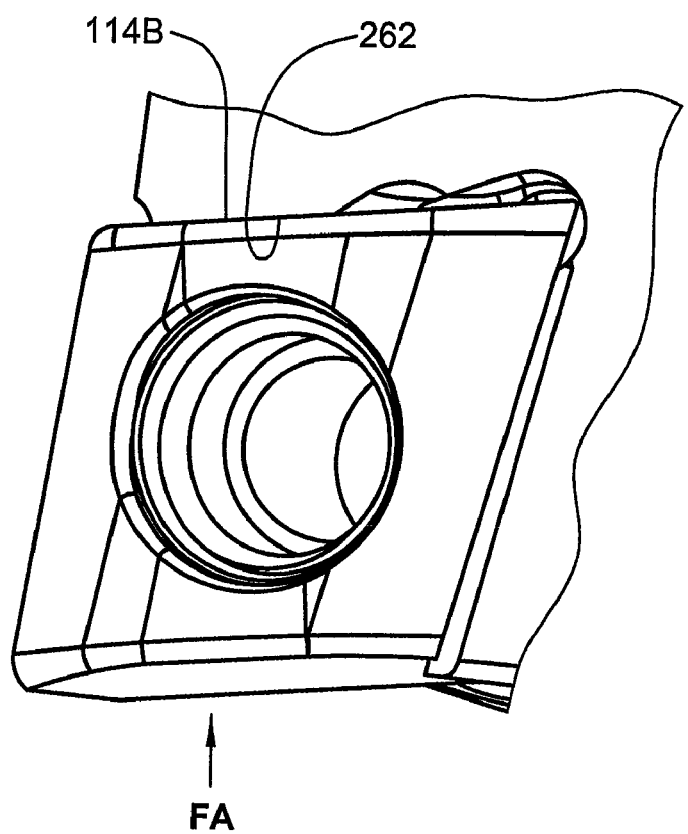
FIG. 13 shows a perspective top view of the cutting insert and cutting tool of FIG. 11.
Figure 14:
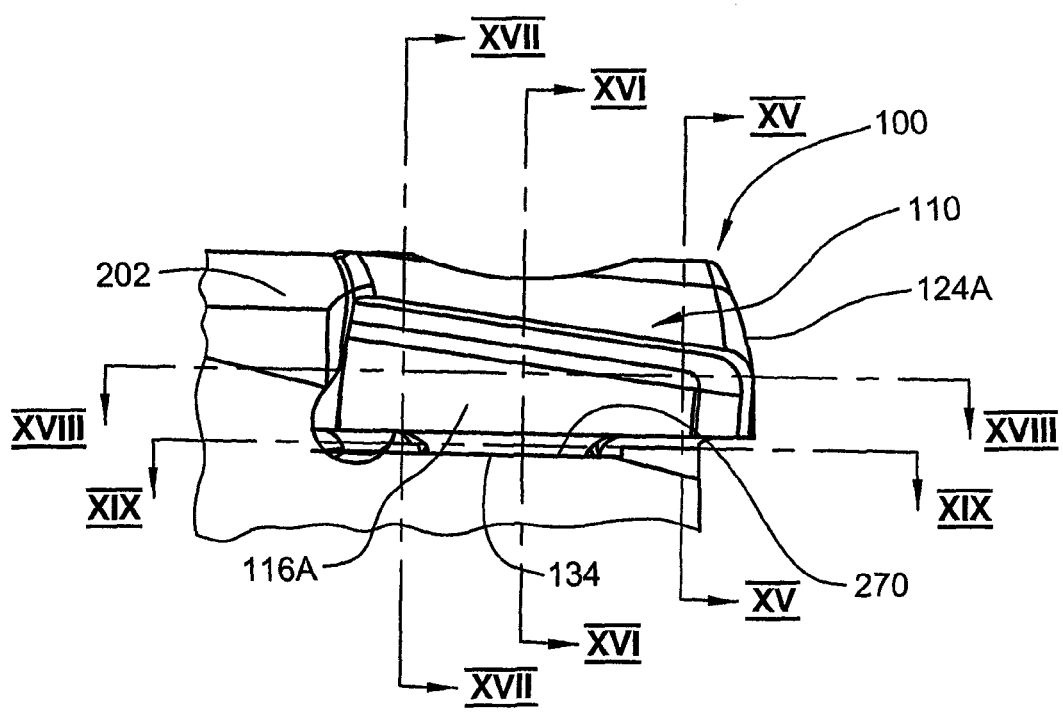
FIG. 14 shows a side view of the cutting insert and cutting tool of FIG. 11.
Figure 15:
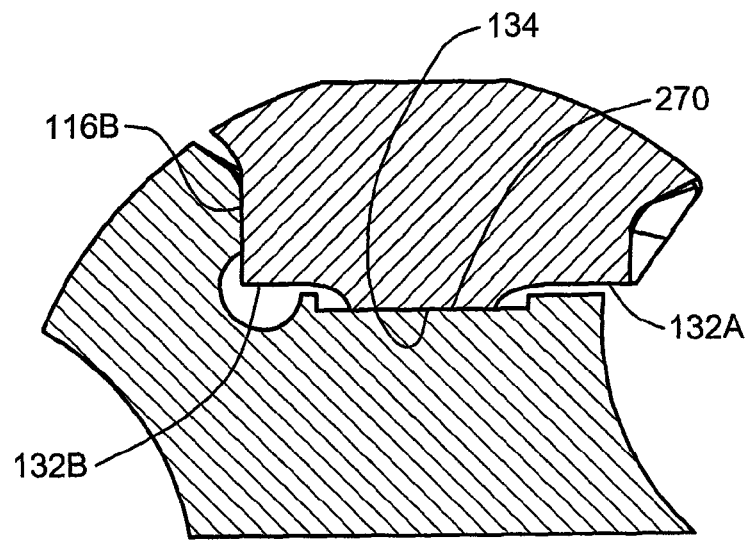
FIG. 15 shows a section view taken along section line XV-XV in FIG. 14.

As seen in the top perspective view of the cutting tool 200 in FIG. 13, the non-operative minor side surface 114B abuts a transversely extending side wall 262 of the insert pocket 206. Generally speaking the transversely extending side wall 262, which is substantially perpendicular to an axis of rotation of the cutting tool 200, serves to counter the axial component FA of the cutting forces experienced by the cutting insert 100.

With reference to FIGS. 14-17, it can be seen that the insert protrusion abutment surface 134 abuts, and is supported by, the pocket base 270. In contrast, there is a clearance between the base surface portions 132A, 132B of the base surface 132 and the pocket base 270. This clearance may enable cooling of the cutting insert during cutting operations.

Figure 16:
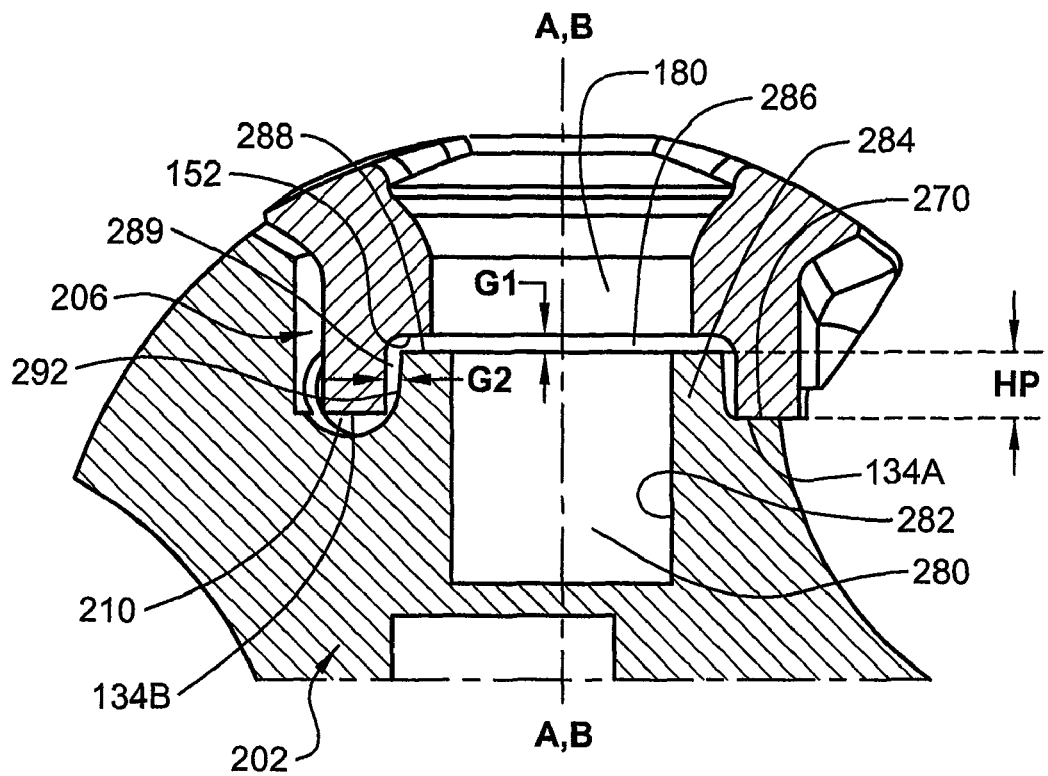
FIG. 16 shows a section view taken along section line XVI-XVI in FIG. 14.
Figure 17:
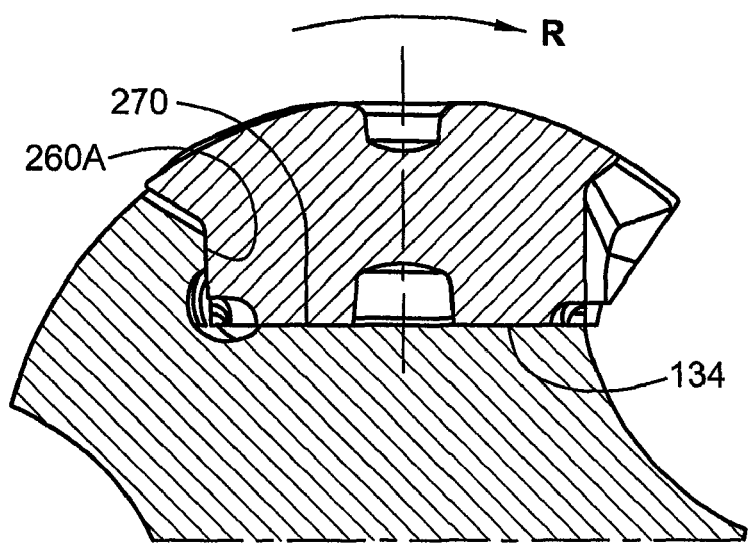
FIG. 17 shows a section view taken along section line XVII-XVII in FIG. 14.

As seen in FIG. 16, when the cutting insert 100 is seated in the insert pocket 206, an outermost portion 134A of the insert protrusion abutment surface 134 rests on a corresponding outermost portion of the pocket base 270 while an innermost portion 134B of the insert protrusion abutment surface 134 remains unsupported by the pocket base 270 and at least partially occupies the longitudinally extending stress relief channel 210.

The pocket base 270 of the insert pocket 206 is provided with a threaded bore 280 having a threaded sidewall 282. The threaded bore 280 is formed in a cylindrical pocket protrusion 284 which rises to a height HP above the pocket base 270 against which the outermost portion 134A of the insert protrusion abutment surface 134 rests. When the cutting insert 100 is seated in the insert pocket 100, the cylindrical pocket protrusion 284 nests in the recess 154 formed in the insert protrusion 136, and an axis B of the threaded bore 280 substantially coincides with the insert's central axis A, to facilitate insertion and retention of a clamping screw 302 (see FIG. 20).

Due to this arrangement, the clamping screw 302 applies pressure on the insert protrusion 284, and so such a clamping screw 302 exerts primarily radial force on the cutting insert 100. This also allows the threads of the clamping screw 302 to engage complementary threads formed in the threaded bore 280 at a point that is close to the through bore 180, thus allowing for more threading. Furthermore, due to the nesting arrangement, the cutting insert 100 must be lifted out of the insert pocket 206 in a radial direction; at least until the insert protrusion abutment surface 134 clears the pocket protrusion 284, a feature that may help prevent the cutting insert 100 from falling out of the insert pocket 206.

With the insert 100 seated, a vertical gap 286 with a height G1 is present between the uppermost portion 288 of the pocket protrusion 286 and the ring-shaped protrusion step 152 formed on the inner surface of the insert through bore 180. The vertical gap 286 ensures that the pocket protrusion 284 does not interfere with the pocket base 270 supporting and abutting the insert protrusion abutment surface 134. Thus, the height of recess H1 exceeds the height HP of the pocket protrusion by approximately this vertical gap height G1.

Figure 19:
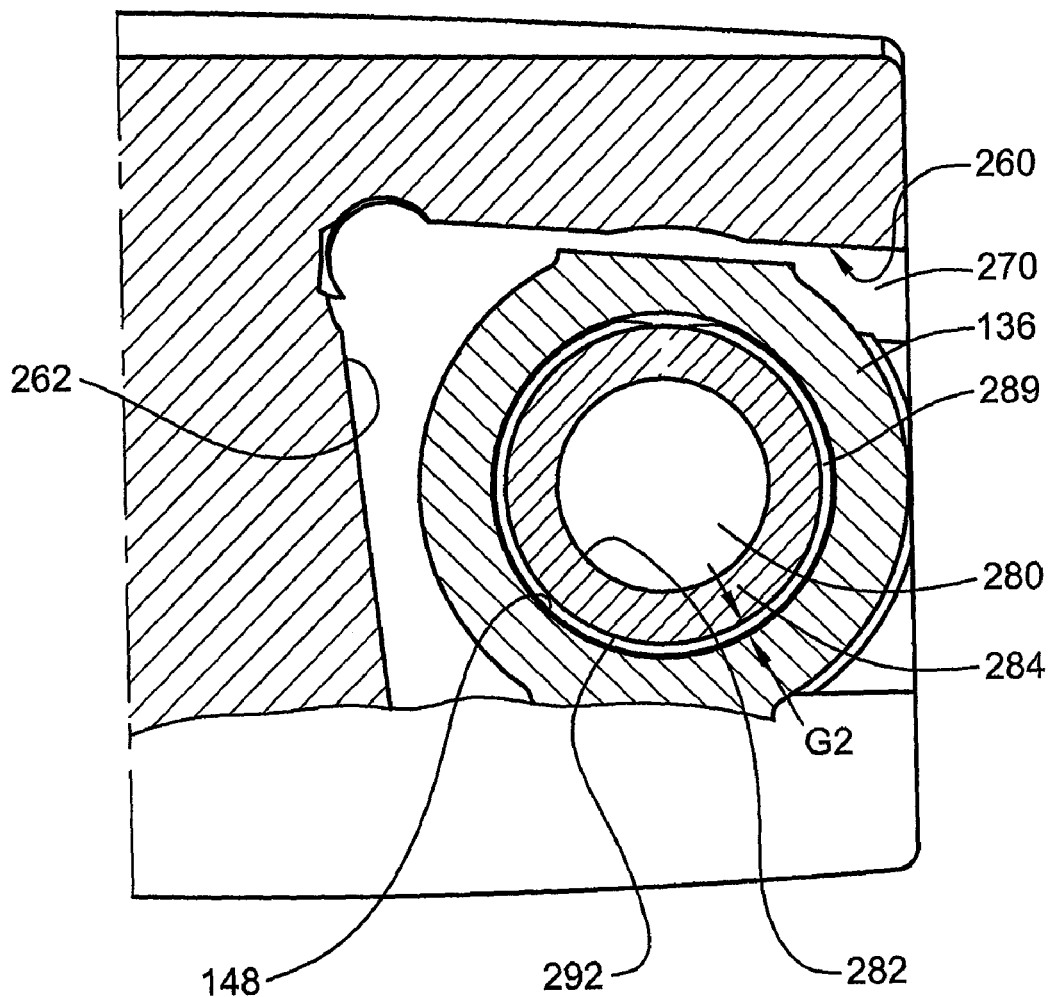
FIG. 19 shows a section view taken along section line XIX-XIX in FIG. 14.

A lateral gap 289 with a width G2 is present between a pocket protrusion outer side wall 292 and the insert protrusion upper inner wall 148. This lateral gap ensures that the cylindrical pocket protrusion 284 nests within the recess without any interference from the cylindrical insert protrusion upper inner wall 148. In other words, the radius of the insert protrusion upper inner wall 148 exceeds the radius of the cylindrical pocket protrusion 284 by this distance G2. As seen in FIG. 19, the lateral gap 289 extends circumferentially, between pocket protrusion outer side wall 292 and the insert protrusion upper inner wall 148. It can be seen from the foregoing, that the pocket protrusion 286 rises from the pocket base 270 and nests within the insert recess 154 without actually contacting surfaces defining the insert recess 154.

Figure 18:
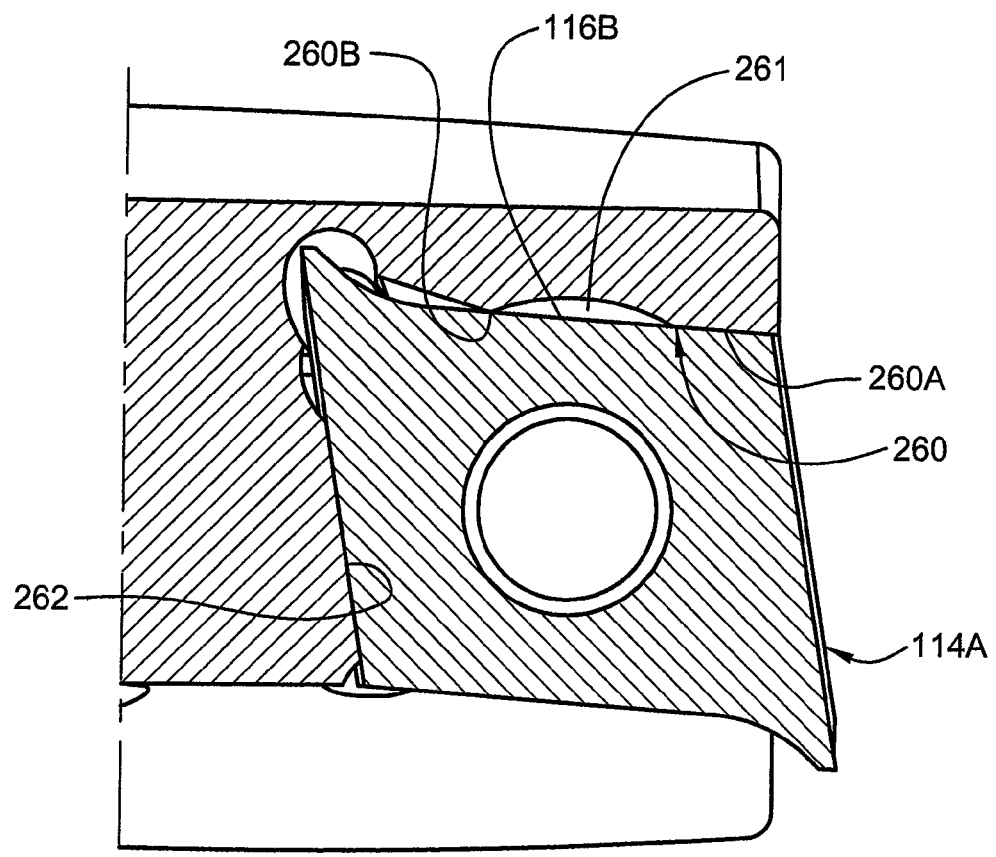
FIG. 18 shows a section view taken along section line XVIII-XVIII in FIG. 14.

As seen in FIG. 18, the longitudinally extending wall 260 comprises a pair of spaced apart abutment surfaces 260A, 260B, separated by a wall recess 261. This allows for stable, three point seating of the cutting insert 100 (the three points being longitudinal wall portions 260A, 260B and lateral wall 262). As mentioned above, one or more rake surfaces of the major side surfaces 116A, 116B may be ground so as to provide consistent, secure abutment with the abutment surfaces 260A, 260B.

Figure 20:
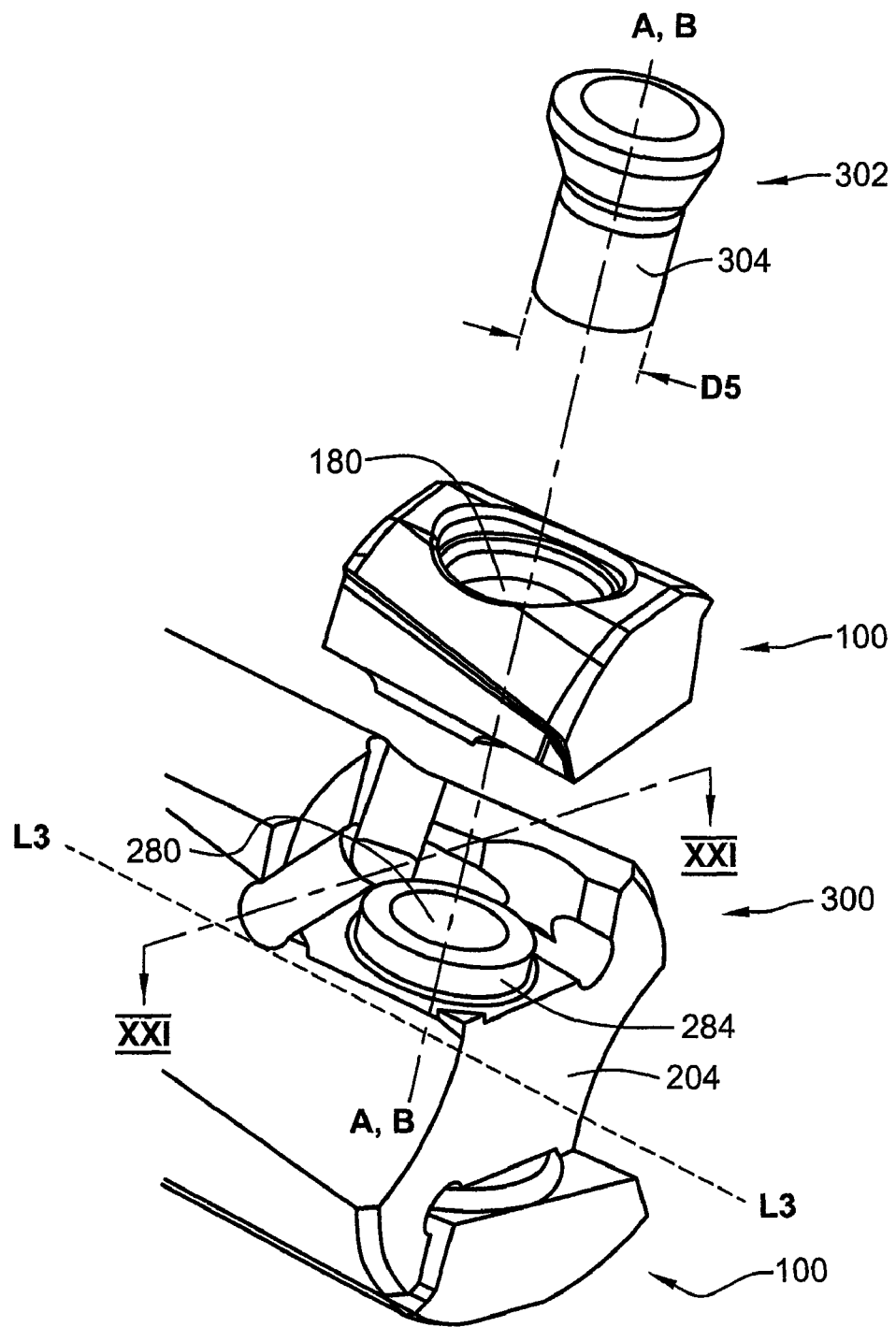
FIG. 20 shows an exploded view of a cutting tool in accordance with one embodiment of the present invention.
Figure 21:
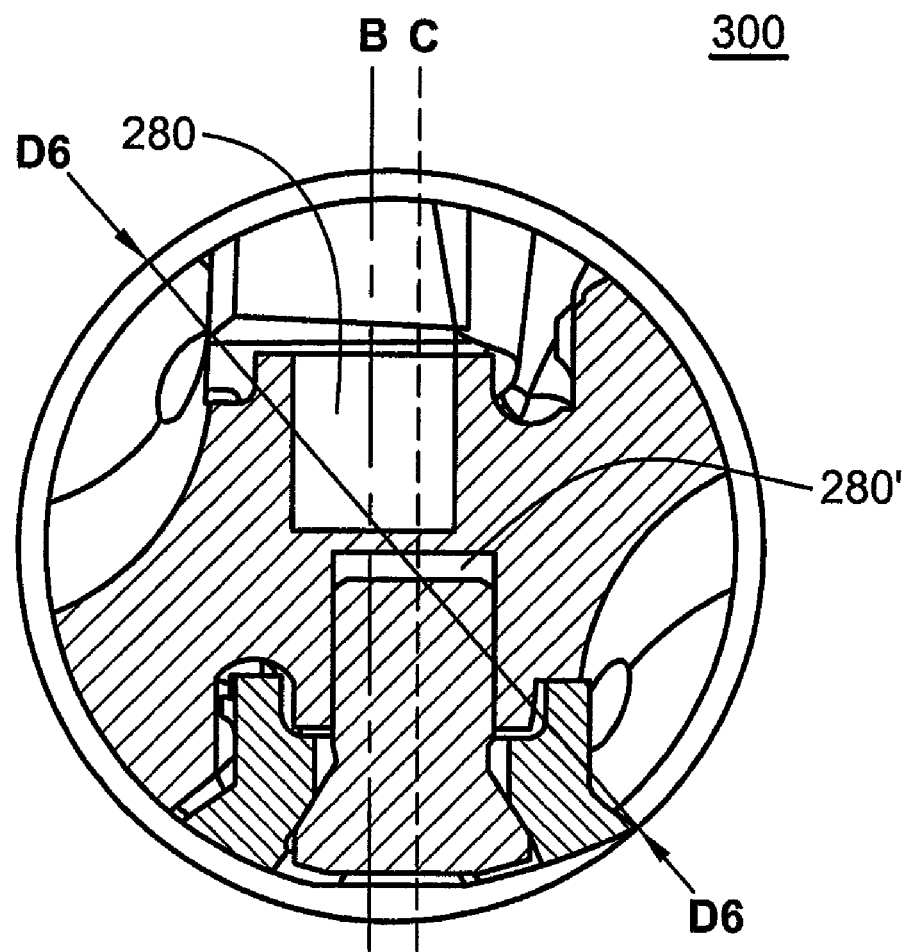
FIG. 21 shows a section view taken along section line XXI-XXI in FIG. 20.

As seen in FIGS. 20 & 21, in one embodiment, a tool 300 is configured to accommodate exactly two cutting inserts 100. Each cutting insert 100 is seated in one of two circumferential insert pockets which are 180° apart around a tool rotational axis L3. The two threaded bores 280, 280' have bore axes B, C, respectively, that are parallel to one another and offset from each other in a lateral direction across the width of the tool 300. As shown in the cross-section of FIG. 21, the tool 300 has a cutting diameter D6 defined by the spacing between the operative major cutting edges belonging to the two inserts (only one of which is shown). Due to the seating arrangement and related geometry, the cutting diameter D6 for the two-insert tool 300 can be less than 10 mm, and in one particular embodiment D6 is 9.52 mm. It is understood that tools with smaller or larger cutting diameters may be formed by varying either or both the insert size and the number of insert pockets spaced around the periphery of the tool, each such insert pocket retaining a cutting insert in accordance with the present invention.

By virtue of the insert recess 154 which receives the complementary pocket protrusion 284, and further by virtue of the insert through bore 180 sufficient to accommodate a clamping screw having a threaded shaft diameter that is a sizeable percentage of the cutting insert's short diagonal D2, the present invention helps achieve secure clamping, even for a thin tangential cutting insert suitable for obtaining small diameters.

In the above-described embodiment, the cutting insert 100 was provided with a protrusion to facilitate seating. It is understood, however, that a cutting insert devoid of such a protrusion, yet having the same cutting geometry and top surface may be produced.

Although the present invention has been described to a certain degree of particularity, it should be understood that various alterations and modifications could be made without departing from the scope of the invention as hereinafter claimed.

What is claimed is:

1. A two-way indexable tangential cutting insert comprising:
    an insert body having a central axis around which the cutting insert has 180° rotational symmetry, a top surface, a bottom surface, peripheral side surface extending between the top and bottom surfaces, the peripheral side surface including a pair of opposing major side surfaces connecting to a pair of minor side surfaces, and an insert through bore extending along the central axis and connecting the top and bottom surfaces;
    first and second major cutting edges formed at the intersection of the major side surfaces, with the top surface having a convex contour which extends between the major cutting edges;
    first and second minor cutting edges each being formed along a juncture between one side of a major side surface and an adjacent minor side surface;
    wherein:
    the bottom surface comprises a base surface and an insert protrusion abutment surface formed on an insert protrusion which rises above the base surface, in a bottom view of the cutting insert;
    the insert protrusion is formed in a central portion of the bottom surface and is at least partially surrounded by the base surface;
    an insert recess is formed in the insert protrusion along the central axis and communicates with the insert through bore;
    the insert recess has a maximum width dimension that is larger than a minimum diameter of the insert through bore;
    the insert recess is shaped to receive and accommodate a pocket protrusion rising from a pocket base of an insert receiving pocket; and
    in a cross-sectional view containing the central axis, a shape of the through bore at the top surface differs from a shape of the through bore at the insert recess.

2. The two-way indexable tangential cutting insert according to claim 1, wherein:
    a major rake surface associated with a major cutting edge is formed in each major side surface;
    the top surface forms a relief surface;
    in a major side view of the cutting insert, a first major cutting edge is sloped from a first raised inner end to first lowered outer end; and
    in a top view of the cutting insert, said first major cutting edge extends at an outward angle, relative to a longitudinal axis of the insert that passes through the minor side surfaces, from said first raised inner end to said first lowered outer end.

3. The two-way indexable tangential cutting insert according to claim 1, wherein:
    each minor side surface is outwardly sloped from the top surface in the direction of the bottom surface.

4. The two-way indexable tangential cutting insert according to claim 1, wherein:
    in a top view, the cutting insert has a short diagonal D1 and the insert through bore has a minimum through bore diameter D2; and
    a ratio D2/D1 is no less than 0.30.

5. The two-way indexable tangential cutting insert according to claim 1, wherein:
    the recess has a maximum diameter that exceeds a minimum diameter of the insert through bore by at least 20%.

6. The two-way indexable tangential cutting insert according to claim 5, wherein:
    the recess has a maximum diameter that exceeds a minimum diameter of the insert through bore by at least 30%.

7. The two-way indexable tangential cutting insert according to claim 1, wherein:
    the insert protrusion is generally ring-shaped and is truncated at opposing truncated outer wall portions.

8. The two-way indexable tangential cutting insert according to claim 7, wherein:
    the opposing truncated outer wall portions merge with major surface lower portions belonging to the opposing major side surfaces.

9. The two-way indexable tangential cutting insert according to claim 8, wherein:
    a pair of opposing bottom abutment edges are formed at a juncture of the insert protrusion abutment surface with the major surface lower portions.

10. The two-way indexable tangential cutting insert according to claim 1, wherein:
    the convex contour comprises a first diagonally opposite pair of identical component convex contours and a second diagonally opposite pair of identical component convex contours;
    members of the first diagonally opposite pair and members of the second diagonally opposite pair do not all lay on a common convex geometric surface.

11. The two-way indexable tangential cutting insert according to claim 10, wherein:
    members of the first diagonally opposite pair lay on a first cylindrical surface; and
    members of the second diagonally opposite pair lay on a different, second cylindrical surface.

12. A rotary cutting tool having a cutting portion comprising an insert pocket having a pocket base and a cutting insert seated on the pocket base, wherein:
    (a) the cutting insert comprises:
        an insert body having a central axis around which the cutting insert has 180° rotational symmetry, a top surface, a bottom surface, peripheral side surface extending between the top and bottom surfaces, the peripheral side surface including a pair of opposing major side surfaces connecting to a pair of minor side surfaces, and an insert through bore extending along the central axis and connecting the top and bottom surfaces;
        first and second major cutting edges formed at the intersection of the major side surfaces, with the top surface having a convex contour which extends between the major cutting edges;
        first and second minor cutting edges each being formed along a juncture between one side of a major side surface and an adjacent minor side surface;
        wherein:
        the bottom surface comprises a base surface and an insert protrusion abutment surface formed on an insert protrusion which rises above the base surface, in a bottom view of the cutting insert;
        the insert protrusion is formed in a central portion of the bottom surface and is at least partially surrounded by the base surface; and
        an insert recess is formed in the insert protrusion along the central axis and communicates with the insert through bore, the insert recess having a maximum width dimension that is larger than a minimum diameter of the insert through bore; and (b) the insert protrusion abutment surface rests on the pocket base; and (c) the insert pocket is provided with a pocket protrusion that rises above the pocket base and nests within the insert recess, the pocket protrusion having a threaded bore formed therein.

13. The rotary cutting tool according to claim 12, wherein the pocket protrusion nests within the insert recess without contacting surfaces that define the insert recess.

14. The rotary cutting tool according to claim 12, wherein:
an outermost portion of the insert protrusion abutment surface rests on a corresponding outermost portion of the pocket base; and
an innermost portion of the insert protrusion abutment surface remains unsupported by the pocket base.

15. The rotary cutting tool according to claim 12, wherein:
the cutting portion comprises exactly two insert pockets, each insert pocket having a cutting insert retained therein.

16. The rotary cutting tool according to claim 15, wherein:
each of the two insert pockets has a threaded bore, each threaded bore having an axis, the axes of the threaded bores being parallel to one another and offset from each other in a lateral direction across a width of the tool.

17. The rotary cutting tool according to claim 15, wherein:
a cutting diameter of the tool is no greater than 10 mm.

18. The rotary cutting tool according to claim 12, wherein:
the convex contour comprises a first diagonally opposite pair of identical component convex contours and a second diagonally opposite pair of identical component convex contours;
members of the first diagonally opposite pair and members of the second diagonally opposite pair do not all lay on a common convex geometric surface.

19. The rotary cutting tool according to claim 18, wherein:
members of the first diagonally opposite pair lay on a first cylindrical surface; and
members of the second diagonally opposite pair lay on a different, second cylindrical surface.

20. A two-way indexable tangential cutting insert comprising:
an insert body having a central axis around which the cutting insert has 180° rotational symmetry, a top surface, a bottom surface, peripheral side surface extending between the top and bottom surfaces, the peripheral side surface including a pair of opposing major side surfaces connecting to a pair of minor side surfaces, and an insert through bore extending along the central axis and connecting the top and bottom surfaces;
first and second major cutting edges formed at the intersection of the major side surfaces, with the top surface having a convex contour which extends between the major cutting edges;
first and second minor cutting edges each being formed along a juncture between one side of a major side surface and an adjacent minor side surface;
wherein:
the bottom surface comprises a base surface comprising an abutment surface;
an insert recess is formed in the base surface along the central axis and communicates with the insert through bore;
the insert recess has a maximum width dimension that is larger than a minimum diameter of the insert through bore;
the insert recess is shaped to receive and accommodate a pocket protrusion rising from a pocket base of an insert receiving pocket; and
in a cross-sectional view containing the central axis, a shape of the through bore at the top surface differs from a shape of the through bore at the insert recess.

21. The two-way indexable tangential cutting insert according to claim 20, wherein:
a major rake surface associated with a major cutting edge is formed in each major side surface;
the top surface forms a relief surface;
in a major side view of the cutting insert, a first major cutting edge is sloped from a first raised inner end to first lowered outer end; and
in a top view of the cutting insert, said first major cutting edge extends at an outward angle, relative to a longitudinal axis of the insert that passes through the minor side surfaces, from said first raised inner end to said first lowered outer end.

22. The two-way indexable tangential cutting insert according to claim 21, wherein:
each minor side surface is outwardly sloped from the top surface in the direction of the bottom surface.

23. The two-way indexable tangential cutting insert according to claim 22, wherein:
in a top view, the cutting insert has a short diagonal D1 and the insert through bore has a minimum through bore diameter D2; and
a ratio D2/D1 is no less than 0.30.

24. The two-way indexable tangential cutting insert according to claim 23, wherein:
the recess has a maximum diameter that exceeds a minimum diameter of the insert through bore by at least 20%.

25. The two-way indexable tangential cutting insert according to claim 24, wherein:
the recess has a maximum diameter that exceeds a minimum diameter of the insert through bore by at least 30%.

* * * * *